(12) United States Patent  
Popp

(10) Patent No.: US 10,753,091 B2  
(45) Date of Patent: Aug. 25, 2020

(54) HEMPCRETE WALL BLOCK PANEL

(71) Applicant: Zachary Josiah Popp, Wittenberg, WI (US)

(72) Inventor: Zachary Josiah Popp, Wittenberg, WI (US)

(*) Notice: Subject to any disclaimer, the term of this patent is extended or adjusted under 35 U.S.C. 154(b) by 0 days.

(21) Appl. No.: 16/352,403

(22) Filed: Mar. 13, 2019

(65) Prior Publication Data

US 2019/0226205 A1    Jul. 25, 2019

Related U.S. Application Data

(60) Provisional application No. 62/650,234, filed on Mar. 29, 2018.

(51) Int. Cl.

| | | |
|---|---|---|
| *E04C 1/41* | (2006.01) | |
| *C04B 28/02* | (2006.01) | |
| *E04B 2/06* | (2006.01) | |
| *E04C 1/40* | (2006.01) | |
| *C04B 28/10* | (2006.01) | |
| *E04B 2/02* | (2006.01) | |

(52) U.S. Cl.
CPC ............... *E04C 1/41* (2013.01); *C04B 28/02* (2013.01); *C04B 28/10* (2013.01); *E04B 2/06* (2013.01); *E04C 1/40* (2013.01); *E04B 2002/023* (2013.01); *E04B 2002/0293* (2013.01)

(58) Field of Classification Search
CPC ..... E04C 1/40; E04C 1/41; E04B 2/06; E04B 28/02; E04B 2002/0293; E04B 2002/023; C08B 28/10; C08B 28/02

See application file for complete search history.

(56) References Cited

U.S. PATENT DOCUMENTS

| | | | | |
|---|---|---|---|---|
| 2,032,852 A | * | 3/1936 | Powell ............... | E04B 1/62 |
| | | | | 52/396.08 |
| 2,383,317 A | * | 8/1945 | Johnson ............. | E04B 2/30 |
| | | | | 52/565 |
| 3,782,049 A | * | 1/1974 | Sachs ................. | E04B 2/26 |
| | | | | 52/309.9 |
| 5,074,088 A | * | 12/1991 | Bergeron ........... | E04B 2/02 |
| | | | | 52/309.12 |
| 7,946,090 B1 | * | 5/2011 | Walters .............. | E04C 1/40 |
| | | | | 52/309.12 |

(Continued)

FOREIGN PATENT DOCUMENTS

EP          2263985 A1 * 12/2010 ............. C04B 28/18

OTHER PUBLICATIONS

Magwood, Chris; Building with Hempcrete or Hemp-Lime, http://endeavourcentre.org/2014/11/building-with-hempcrete-or-hemp-lime/, Nov. 2, 2014 (Year: 2014).*

(Continued)

*Primary Examiner* — Theodore V Adamos  
(74) *Attorney, Agent, or Firm* — Barry Choobin; Patent 360

(57) ABSTRACT

A hempcrete wall comprising a stud wall, a hemprecte block panel including hemp hurd, hydrated type S lime, and a pumice, and a lumber embedded in the hemprete block panel with holes that allows fixing the hempcrete block panel to the stud wall. The hempcrete block includes a 17.5 lbs of hemp hurd, 10 lbs hydrated type S lime, 17 lbs of powdered pumice, and 44 lbs water.

10 Claims, 3 Drawing Sheets

(56) References Cited

U.S. PATENT DOCUMENTS

| | | | |
|---|---|---|---|
| 2003/0066262 A1* | 4/2003 | Putnam | E04C 2/246 52/841 |
| 2004/0216408 A1* | 11/2004 | Hohmann, Jr. | E04B 1/4178 52/426 |
| 2011/0154764 A1* | 6/2011 | Wang | C04B 28/02 52/309.1 |
| 2013/0145968 A1* | 6/2013 | Scanlan | C04B 32/00 106/676 |
| 2013/0205703 A1* | 8/2013 | Baumer | C04B 28/12 52/572 |
| 2014/0075856 A1* | 3/2014 | Hohmann, Jr. | E04B 1/4178 52/167.1 |
| 2016/0229760 A1* | 8/2016 | Dry | C09D 1/00 |
| 2017/0292265 A1* | 10/2017 | Winter | E04B 2/26 |

OTHER PUBLICATIONS

Dinh et al., Hemp Concrete Using Innovative Pozzolanic Binder, https://www.researchgate.net/publication/279851063_Hemp_concrete_using_innovative_pozzolanic_binder, Jun. 2012 (Year: 2012).*

Machine translation of foreign reference EP 2263985, obtained from https://translationportal.epo.org/emtp/translate/?ACTION=description-retrieval&COUNTRY=EP&ENGINE=google&FORMAT=docdb&KIND=A1&LOCALE=en_EP&NUMBER=2263985&SRCLANG=fr&TRGLANG=en (last accessed on Jan. 28, 2020) (Year: 2020).*

\* cited by examiner

HEMPCRETE WALL BLOCK PANEL

BACKGROUND

Hempcrete or hemcrete has been used as a building material for a long time. It has been recently popularized in several European countries. Traditionally hempcrete has been cast to form monolithic wall structures, much like poured concrete. Hempcrete has always been a mixture of hydraulic lime, hemp shiv (or hurd), and water. Cast, monolithic walls must be allowed to dry out until moisture content is below 20% in order to be finished and usable.

Currently, hempcrete as a material being used one of two ways. One way is by being cast into forms on site to construct monolithic wall structures of hempcrete around a timber frame. The hempcrete has to be left to dry for 6-8 weeks before it is finished, delaying construction. There are also currently hempcrete blocks that are being used with both built in wood framing and without wood framing. These blocks are simply rectangular in shape and are deficient in the way that they either do not take the place or insulation and structural loading fully, or they cannot be used between traditional wood lumber framing to provide sufficient compressive strength.

Another shortcoming of traditional hempcrete in general is the necessity to use hydraulic lime to ensure a quick set in order for the hempcrete product to maintain its shape. Further, no current hempcrete product has any material that allows retaining shape and structural strength. No current hempcrete panel also incorporates the use of horizontal wood support in order to increase racking and transverse load strength.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of hempcrete wall block panel are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Hempcrete or Hemplime is bio-composite material, used as a material for construction and insulation. It is marketed under names like Hempcrete, Canobiote, Canosmose, and Isochanvre. The current invention provides a hempcrete block panels which is used in conjunction with 2×6 or 2×4 lumber that allows for walls that can be constructed rapidly.

Figure 1:
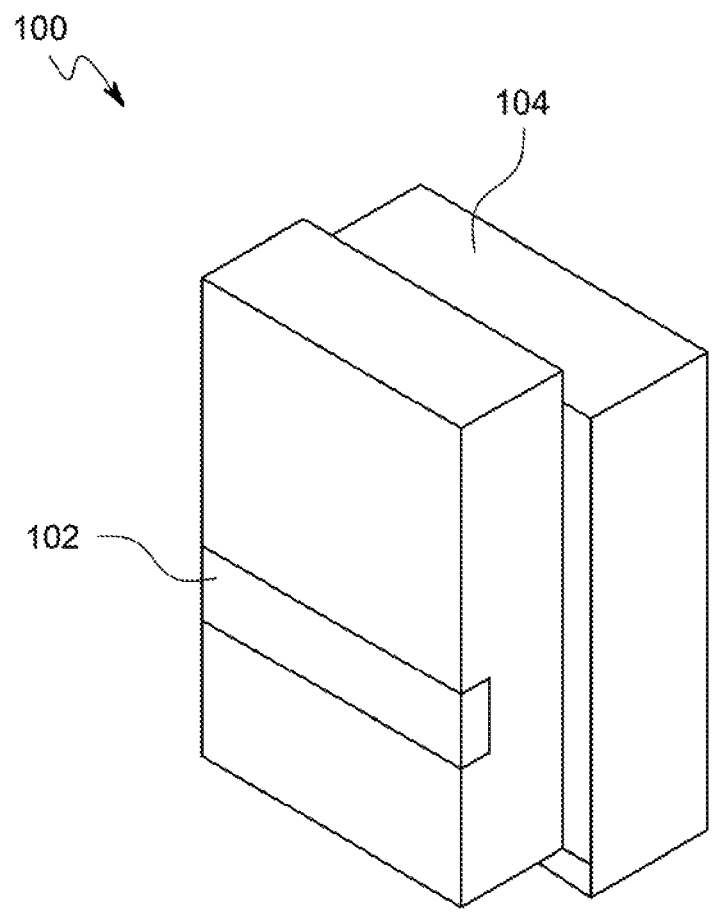
FIG. 1 is a block diagram illustrating a hempcrete block panel, according to an embodiment.

FIG. 1 is a block diagram illustrating a hempcrete block panel 100, according to an embodiment. A hempcrete block panel 100 is a building block of a hempcrete wall. The hempcrete block panel 100 is constructed using a combination of hemp hurd, hydrated type S lime, powdered pumice and water.

Hemp hurds, also known as strives or hemp wood, are an agricultural product made from hemp. In one embodiment, hurds consist of the woody inner portion of the hemp stalk, broken into pieces and separated from the fiber in the processes of breaking and scutching and correspond to the shives in flax, but are coarser and usually softer in texture. Hurds have traditionally been a by-product of fiber production.

Type S hydrated lime is defined by high early plasticity, high water-retention values, limited oxide content, and minimal coarse fraction. These qualities are highly valued for plaster and mortar. Pumice, which may be termed as pumicite in its powdered or dust form, is a volcanic rock that consists of highly vesicular rough textured volcanic glass. The use of pumice and type S hydrated lime allows the hydrated lime to set up quickly resulting in reduced time for construction using the hempcrete block panel 100.

In one embodiment, to build the hempcrete block panel 100 initially a casting operation is performed in which 17.5 lbs of hemp hurd which is chopped up into pieces smaller than ½ inches in length, 10 lbs hydrated type S lime, 17 lbs of powdered pumice, and 44 lbs water, and a section of 3×4 dimensional lumber 14.125 inches in length are initially mixed. This particular ratio of hemp hurd, hydrated type S lime, powdered pumice, and water maximizes structural strength for the hempcrete block panel 100. Next the exterior of each unit is wrapped with non-adhesive EIFS stucco mesh. Each hempcrete block panel is then forced air dried in a wind tunnel over the course of 48-96 hours until at least 26 lbs of the water has been evaporated. The complete exterior of the block panel is then covered with a scratch coal of lime plaster in order to help hold the EIFS stucco mesh in place. The EIFS stucco mesh helps retain shape and structural strength of the hempcrete block panel 100.

In one embodiment, the 3×4 or 2×6 dimensional lumber 102 is embedded horizontally on the back side of the hempcrete block panel 100. The lumber 102 provided additional structural support, racking and traverse load strength, to the hempcrete block panel 100. Further, holes can be drilled within this lumber 102 that allows fixing the hempcrete block panel to a wooden stud wall to quickly build external and internal wall structure for home and offices.

In one embodiment, the hempcrete block panel 100 structure include recess 104 that allows different panels to interlock with each other creating a wall of any height After the hempcrete block panel 100 is mated to the wall stud using the holes within the embedded lumber 102, the interior of the structure is plastered with a lime-based plaster and the exterior is Stucco'd with a lime-based render. After plastering and rendering, the finished product will take the place of a traditional home's siding/cladding, vapor barrier, wall shearing, insulation, sheetrock and dry wall.

Figure 2A:
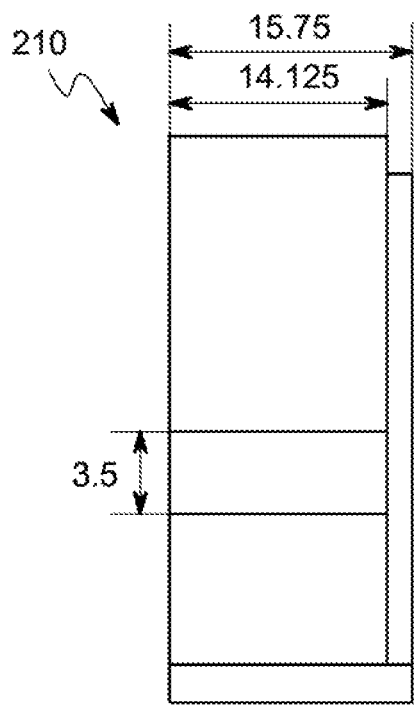
FIG. 2A is a block diagram illustrating a front interor face of an exemplary hempcrete block panel, according to an embodiment.
Figure 2B:
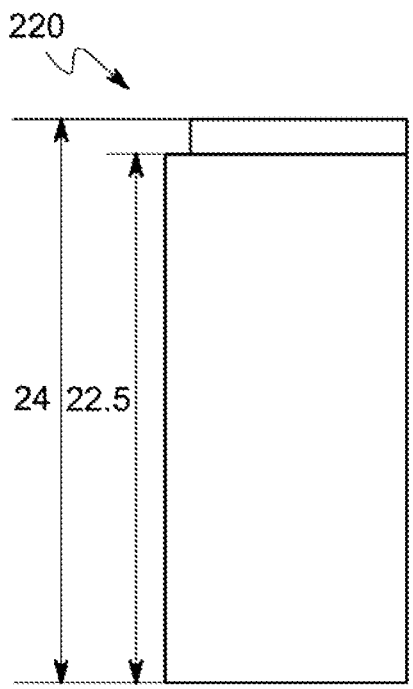
FIG. 2B is a block diagram illustrating a backside exterior face of the exemplary hempcrete block panel, according to an embodiment.

FIGS. 2A-2D are block diagrams illustrating various dimensions of an exemplary hempcrete block panel, according to an embodiment. FIG. 2A shows a front interor face 210 of the hempcrete block panel. As shown, the hempcrete block panel is 14.125 inches wide on the interior face and 15.75 inches wide on the exterior face. As shown, a 3.5 inch lumber is also inserted horizontally in the hempcrete block panel. FIG. 2B shows a backside exterior face 220 of the hempcrete block panel. The interior of the hempcrete block panel has a height of 24 inches and the internal face of the hempcrete block panel has a height of 22.5 inches.

Figure 2C:
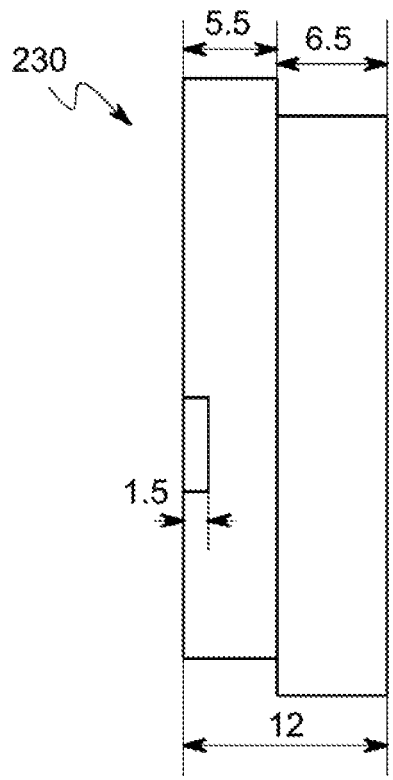
FIG. 2C is a block diagram illustrating a right side view of the exemplary hempcrete block panel, according to an embodiment.
Figure 2D:
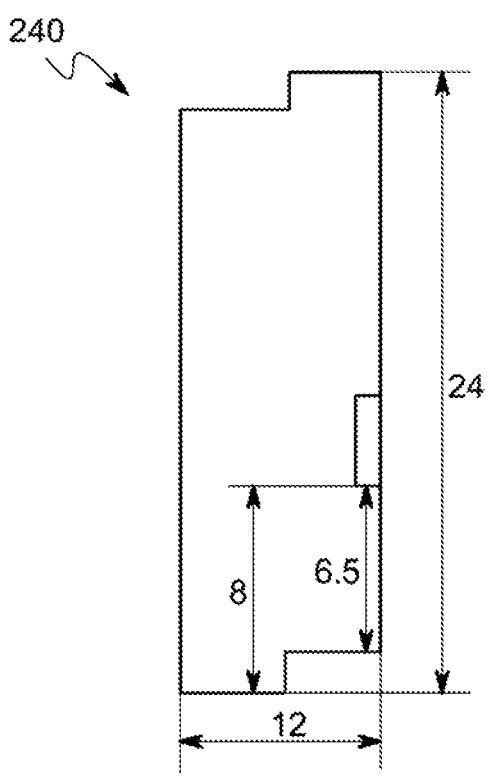
FIG. 2D is a block diagram illustrating a left side view of the exemplary hempcrete block panel, according to an embodiment.

FIG. 2C is a right-side view 230 of the hempcrete block panel. The thickness of the hempcrete block panel is 12 inches. As shown, the interior face of the hempcrete block panel has a thickness of 5.5 inches and the exterior face of the hempcrete block panel has a thickness of 6.5 inches. The depth of the hempcrete block panel is 1.5 inches. A recess is formed by positioning the inner surface of the hempcrete block panel above the exterior surface. The recess allows two panels to interlock with each other. FIG. 2D is a left-side view 240 of the hempcrete block panel. As shown, the height of the hempcrete block panel is 24 inches in length. The distance of the lumber from the base of the hempcrete block panel is 8 inches and from the front side is 6.5 inches.

Figure 3:
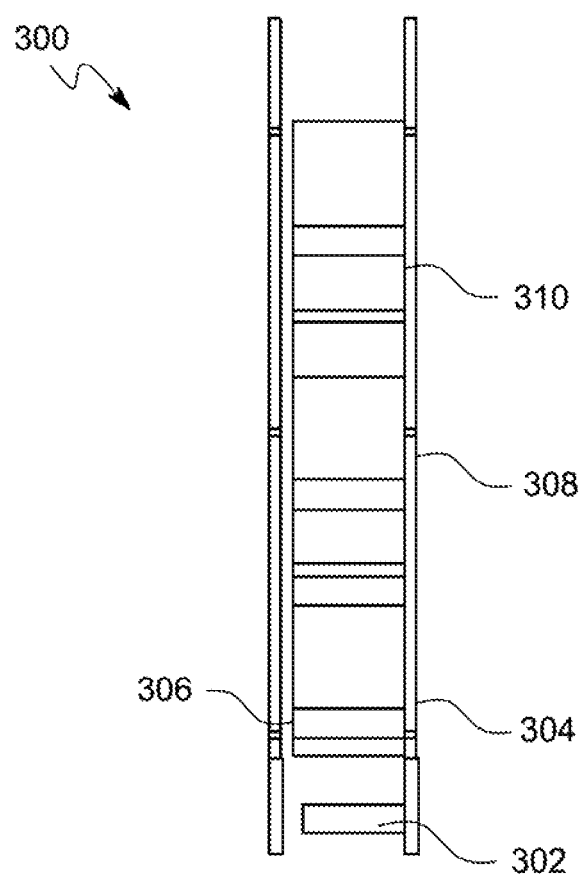
FIG. 3 is a block diagram illustrating a wall using the hempcenter block panel, according to an embodiment.

FIG. 3 is a block diagram illustrating a wall 300 using the hempcenter block panel, according to an embodiment. The wall 300 is constructed by first fastening a 3×4 or 2×6 bottom plate section of wood dimensional lumber 302 to the floor. From the inside of the structure, the first 3×4 or 2×6 stud is placed vertical on the far-right corner of any wall and then leveled and braced. The first hempcrete wall block panel 304 is then placed on top of the bottom plate 302 and next to the first stud so that the bottom plate 302 recesses into the block panel 304 on the bottom interior face and a stud recesses into block panel 304 on the right interior face of the block panel. Two screws are then inserted into the pre-drilled holes within the wood cross-member 306 within the block panel to fasten the block panel 304 to the stud. Consecutive block panels 308 and 310 are then placed on top of each other with protruding sections of the top and bottom overlapping to create the effect of interlocking panels. Block panels are stacked until the desired wall height is obtained.

The second stud is placed tight against the first column of block panels and two screws are then inserted into each block panel on the left side to fasten each panel to the second stud. This process is repeated until the desired wall width is obtained.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably." "preferred." "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

In the above description, numerous specific details are set forth to provide a thorough understanding of embodiments. One skilled to the relevant art will recognize, however that the embodiments can be practiced without one or more of the specific details or with other methods, components, techniques, etc. In other instances, well-known operations or Structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A hemperete block panel comprising:
   a block including hemperete, the hemperete includes hemp-hurd, hydrate type S Lime, and a pumice, the block comprising of front and rear rectangular sections, each rectangular section comprising of top and bottom sides and two vertical sides, where one vertical side of each rectangular section is substantially coplanar with one another and the other vertical side and the top and bottom sides of each rectangular section are offset from one another to form a step-shape recess such that the rear rectangular section is positioned above the front rectangular section, wherein the step-shape recess of the top and bottom sides are configured to allow two panels to interlock with each other and the step-shape recess of the other vertical side is configured to receive a stud; and
   a lumber embedded horizontally into the hemperete of the rear rectangular section, the lumber configured for providing structural support, racking, and traverse load strength to the hemperete block panel, the lumber configured for mounting the hemperete block panel to a wooden stud wall.

2. The hemperete block panel according to claim 1, wherein the hemperete block panel includes a non-adhesive EIFS stucco mesh.

3. The hemperete block panel according to claim 1, wherein the hemperete block panel includes a coat of lime.

4. The hemperete block panel according to claim 1, wherein depth of the lumber is 1.5 inches.

5. The hemperete block panel according to claim 1, wherein the hemperete block panel is prepared by a process comprising the steps of:
   mixing chopped pieces of hemp hurd, hydrated S-lime, and pumice in water;
   molding the mixture into a block;
   integrating a lumber into the mixture;
   wrapping the block of mixture with a non-adhesive EIFS stucco; and
   air drying the block till the water content is reduced to a predetermined level.

6. The method hemperete block panel of claim 5, wherein the mixture comprises 17.5 pounds of hemp hurd, 10 pounds hydrated type S lime, 17 pounds of powdered pumice, and 44 pounds water, and the block is air dried till at least 26 pounds of water is evaporated.

7. A hemperete wall comprising:
   a stud wall;
   a hemperete block panel including hemperete, the hemperete includes hemp-hurd, hydrated type S lime, and a pumice, the hemperete block panel comprising of front and rear rectangular sections, each rectangular section comprising of top and bottom sides and two vertical sides, where one vertical side of each rectangular section is substantially coplanar with one another and the other vertical side and the top and bottom sides of each rectangular section are offset from one another to form a step-shape recess such that the rear rectangular section is positioned above the front rectangular section, wherein the step-shape recess of the top and bottom sides are configured to allow two panels to interlock with each other and the step-shape recess of the other vertical side is configured to receive a stud of the stud wall; and
   a lumber embedded horizontally into the hemperete of the rear rectangular section, the lumber fixes the hemperete block panel to the stud wall.

8. The hemperete block panel according to claim 7, wherein the hemperete block panel includes a non-adhesive EIFS stucco mesh.

9. The hemperete wall according to claim 7, wherein the hemperete block panel includes a coat of lime.

10. The hemperete wall according to claim 7, wherein depth of the lumber is 1.5 inches.

* * * * *